US012721259B2

(12) United States Patent
Bostan

(10) Patent No.: US 12,721,259 B2
(45) Date of Patent: Sep. 1, 2026

(54) MOWER UNIT AND WORK MACHINE INCLUDING MOWER UNIT

(71) Applicant: KUBOTA CORPORATION, Osaka (JP)

(72) Inventor: Alexandru Bostan, Gainesville, GA (US)

(73) Assignee: KUBOTA CORPORATION, Osaka (JP)

(*) Notice: Subject to any disclaimer, the term of this patent is extended or adjusted under 35 U.S.C. 154(b) by 325 days.

(21) Appl. No.: 18/588,742

(22) Filed: Feb. 27, 2024

(65) Prior Publication Data

US 2025/0268129 A1 Aug. 28, 2025

(51) Int. Cl.

*A01D 34/66* (2006.01)
*A01D 34/81* (2006.01)
*A01D 101/00* (2006.01)

(52) U.S. Cl.

CPC .......... *A01D 34/661* (2013.01); *A01D 34/81* (2013.01); *A01D 2101/00* (2013.01)

(58) Field of Classification Search

CPC .. A01D 34/661; A01D 34/81; A01D 2101/00; A01D 34/828

See application file for complete search history.

(56) References Cited

U.S. PATENT DOCUMENTS 7,469,525 B2 12/2008 Zeigler et al.
7,735,305 B1 * 6/2010 Cozine .................. A01D 34/81 56/17.4
9,699,966 B2 7/2017 Shaver et al.
10,674,664 B2 * 6/2020 Hultgren .............. A01D 43/063
11,178,816 B2 * 11/2021 Anderson .............. A01D 34/81

FOREIGN PATENT DOCUMENTS

CA 2262107 A1 * 12/1999 ............. A01D 34/76

OTHER PUBLICATIONS

Iseki Mower Deck Cover System (Assembly Drawing) retrieved from https://www.worldofmowers.co.uk/iseki-spare-parts/iseki-mowers/after-2015-models/sf370-310/pc-ssm60-s1370-8654-097-330-0a/mower-deck-cover-system on May 27, 2024.

* cited by examiner

*Primary Examiner* — Nicole Coy
(74) *Attorney, Agent, or Firm* — Greenblum & Bernstein, P.L.C.

(57) ABSTRACT

A mower unit mountable on a travel body includes a mower deck open downward, a rotary blade disposed inside the mower deck and rotatable about a vertical axis, a rotor disposed outside the mower deck and configured to transmit a rotation motive power to the rotary blade, a cover unit covering the rotor, and mounting mechanisms detachably mounting the cover unit on the mower deck. The mounting mechanisms includes a tool-based mounting mechanism involving a tool to detach the cover unit, and a tool-free mounting mechanism involving no tool to detach the cover unit.

12 Claims, 7 Drawing Sheets

12
11
13
10
1a(1)
2a(2)
42
100
29
21
32
1
BM
3
31
30
U
D
B
F

3
R
F
B
L
33
422
(42)
43a
(43)
22b
23b
44
421
(42)
31c
31f
4(1)
32r
(32)
423
(42)
30
25c
41
43b,63b
(43,63)
BM
31d
621
(62)
22c
64(31g)
6(1)
61
31
23c
25a
31b
53b,63a
(53,63)
25b
32f
(32)
32r
(32)
521
(52)
53a
(53)
54
5(1)
31a
31e
51
523
(52)
22a
522
(52)
23a 3
31
422
(522)
30
4(5)
43a(53a)
22b(22a)
23b(23a)
31f(31e)
IV
31c
(31a)
IV
421
(521)
BM
41
(51)
29
44(54)
32r
(32)

3

41(51)
4(5)
23b(23a)
22b(22a)
423
(523)
31c
(31a)
43a
(53a)
29
31
30
31f(31e)
421
(521)
44(54)
32r
(32)
21a(21b)

31b(31d)
63a(63b)
63a'(63b')
6
5(4)
31a(31c)
53a(43a)

63a(63b)
31b(31d)
63a'(63b')
6
5(4)
31a(31c)
53a(43a)

30
31
43a(53a)
31c(31a)
31f
(31e)
4(5)
31d(31b)
43b(53b)
43b'(53b')
6

30
31
43a(53a)
31c(31a)
31f
(31e)
4(5)
43b(53b)
31d(31b)
43b'(53b')
6

MOWER UNIT AND WORK MACHINE INCLUDING MOWER UNIT

BACKGROUND OF THE INVENTION

Field of the Invention

The present invention relates to a mower unit and a work machine including a mower unit.

Description of the Related Art

A mower unit is mountable on a riding-type travel body to cut grass. Such a mower unit includes a mower deck with a top plate and rotors such as pulleys disposed on the top plate and configured to transmit motive power from a power source. The mower unit may further include a cover disposed on the mower deck and covering the rotors.

SUMMARY OF THE INVENTION

Such a cover needs to be securely mounted on the mower deck while the mower unit is in operation, and should desirably be structured to be easily removable and mountable for maintenance.

A mower unit according to an embodiment of the present invention is a mower unit mountable on a travel body, the mower unit including:

a mower deck open downward;

a rotary blade disposed inside the mower deck and rotatable about a vertical axis;

a rotor disposed outside the mower deck and configured to transmit a rotation motive power to the rotary blade;

a cover unit covering the rotor; and mounting mechanisms detachably mounting the cover unit on the mower deck, the mounting mechanisms including: a tool-based mounting mechanism involving a tool to detach the cover unit; and a tool-free mounting mechanism involving no tool to detach the cover unit.

Including a tool-based mounting mechanism as above means the need for a tool in removing the cover unit from the mower deck. This allows the cover unit to remain securely mounted on the mower deck while the mower unit is in operation. Further, including a tool-free mounting mechanism as above reduces the number of locations that require a tool in removing the cover unit from the mower deck and mounting the cover unit onto the mower deck. This allows the mower unit to be maintained easily.

The mower unit may preferably be configured such that the cover unit includes: a first cover including a tool-based mounting portion as a mounting portion for the tool-based mounting mechanism; and at least one second cover including a tool-free mounting portion as a mounting portion for the tool-free mounting mechanism and including no tool-based mounting portion, wherein with the at least one second cover mounted on the mower deck with use of the tool-free mounting mechanism, mounting the first cover onto the mower deck with use of the tool-based mounting mechanism prevents the at least one second cover from being removed from the mower deck, and removing the first cover from the mower deck allows the at least one second cover to be removed from the mower deck.

With the above configuration, mounting the first cover onto the mower deck results in a state in which removing the second cover from the mower deck requires first removing the first cover from the mower deck with use of a tool. This reduces the number of locations that require a tool in removing the cover unit from the mower deck and mounting the cover unit onto the mower deck.

The mower unit may preferably be configured such that the first cover covers a portion of the at least one second cover when mounted on the mower deck.

With the above configuration, mounting the first cover onto the mower deck in such a manner as to cover a portion of the second cover results in a state in which removing the second cover from the mower deck requires first removing the first cover from the mower deck with use of a tool. This reduces the number of locations that require a tool in removing the cover unit from the mower deck and mounting the cover unit onto the mower deck.

The mower unit may preferably be configured such that the at least one second cover includes: a left cover leftward of the first cover; and a right cover rightward of the first cover, and the first cover has (i) a left end portion overlapping a right end portion of the left cover and (ii) a right end portion overlapping a left end portion of the right cover.

With the above configuration, mounting the first cover onto the mower deck in such a manner as to cover a portion of the right cover and a portion of the left cover results in a state in which removing the second cover from the mower deck requires first removing the first cover from the mower deck with use of a tool.

This reduces the number of locations that require a tool in removing the cover unit from the mower deck and mounting the cover unit onto the mower deck.

The mower unit may preferably be configured such that the first cover further includes a tool-free mounting portion.

The above configuration allows the first cover to be mounted on the mower deck with use of the tool-based mounting mechanism and the tool-free mounting mechanism. This allows the first cover to be securely mounted on the mower deck.

The mower unit may preferably be configured such that the first cover and the at least one second cover share at least a portion of the tool-free mounting mechanism.

The above configuration reduces the number of components of the tool-free mounting mechanism, and further facilitates removing the cover unit from the mower deck and mounting the cover unit onto the mower deck.

The mower unit may preferably be configured such that the first cover and the at least one second cover share a portion of the tool-free mounting mechanism which portion is disposed in an area in which the first cover and the at least one second cover overlap each other.

The above configuration allows the first and second covers to overlap each other easily.

The mower unit may preferably be configured such that the tool-based mounting mechanism includes a bolt for fixing the cover unit to the mower deck.

With the above configuration, the tool-based mounting mechanism includes a bolt, which is a common element.

The mower unit may preferably be configured such that the tool-free mounting mechanism is configured such that moving the cover unit from a first side in a front-back direction toward a second side in the front-back direction mounts the cover unit onto the mower deck.

With the above configuration, simply moving the cover unit allows it to be mounted on the mower deck with use of the tool-free mounting mechanism.

The mower unit may preferably be configured such that the tool-free mounting mechanism includes: at least one stud disposed on the mower deck and insertable through a hole in the cover unit; and a hook disposed on the mower deck configured to receive a tongue on the cover unit.

With the above configuration, the tool-free mounting mechanism includes a stud and hook, which are simple elements.

The mower unit may preferably be configured such that the at least one stud is forward in a front-back direction of the travel body, and the hook is backward in the front-back direction of the travel body.

With the above configuration, moving the cover unit backward from the front side allows it to be mounted on the mower deck.

The mower unit may preferably be configured such that the at least one stud includes a plurality of studs at least one of which the first cover and the at least one second cover share.

With the above configuration, simply fitting the same stud into a hole in the first cover and a hole in the second cover allows the first and second covers to overlap each other.

A work machine according to an embodiment of the present invention includes: a body; and a mower unit having any one of the above configurations.

The work machine configured as above includes an easily maintainable mower unit.

DETAILED DESCRIPTION OF THE PREFERRED EMBODIMENTS

Figure 1:
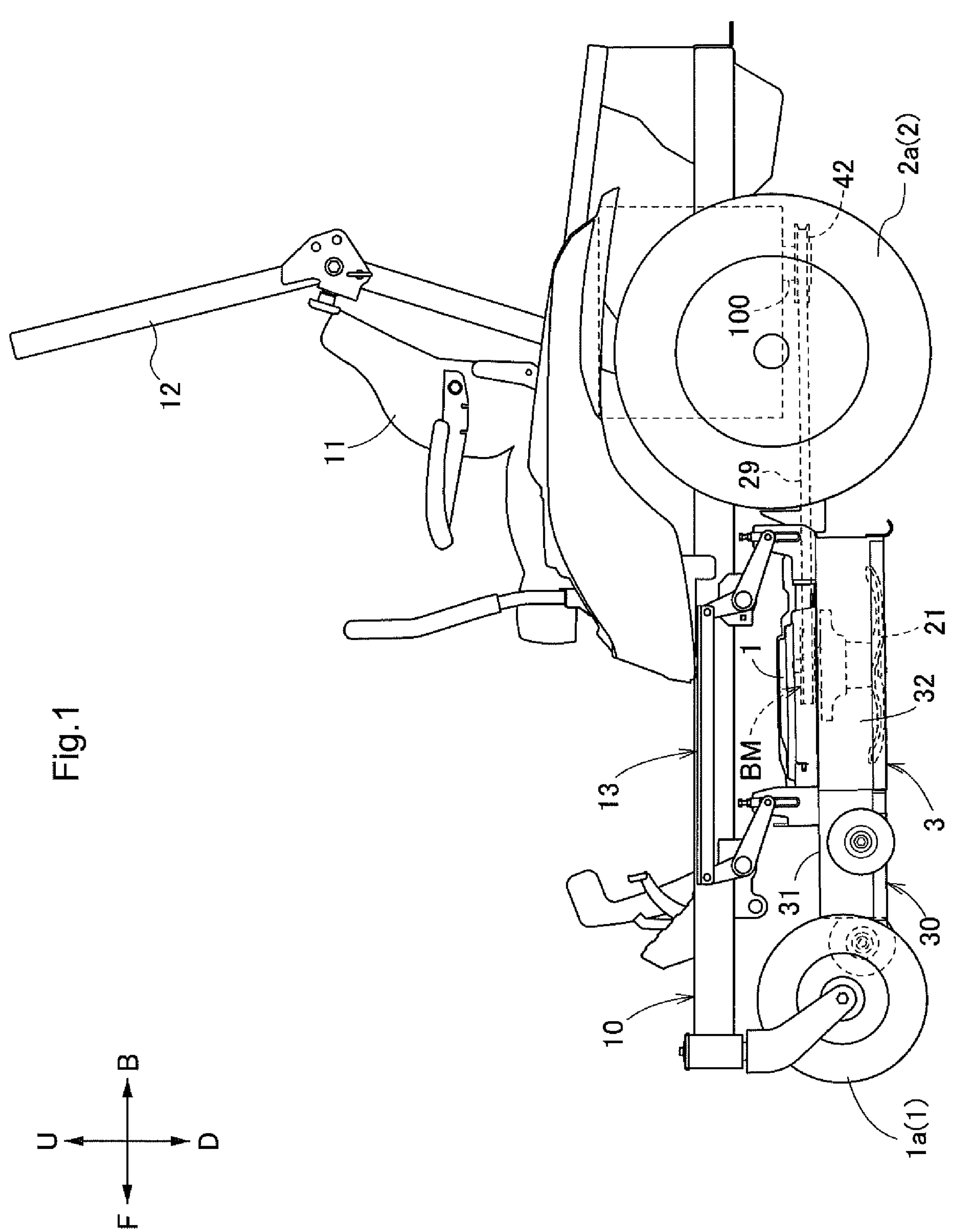
FIG. 1 is a side view of a work machine with a mower unit in its entirety.

The description below deals with a mower including a mower unit 3 as an embodiment of the present invention with reference to drawings. FIG. 1 is a side view of a mid-mount, riding-type mower as an example mower. The description below of the present embodiment refers to directions related to the mower and the mower unit 3 as follows: Arrow F shown in FIGS. 1, 2, and 3 indicates the forward direction of the mower; arrow B shown in the same drawings indicates the backward direction of the mower; arrow L shown in FIGS. 2 and 3 indicates the leftward direction of the mower; arrow R shown in the same drawings indicates the rightward direction of the mower; arrow U shown in FIG. 1 indicates the upward direction of the mower; and arrow D shown in the same drawings indicates the downward direction of the mower.

The mower includes a front wheel unit 1, a driving wheel unit 2, a vehicle body 10, an engine, a driver's seat 11, a roll-over protection frame 12, a lifting/lowering mechanism 13, and a mower unit 3. The front wheel unit 1 includes a left front wheel 1*a* and a right front wheel 1*b* each in the form of a freely rotatable caster. The driving wheel unit 2 includes a left rear wheel 2*a* and a right rear wheel 2*b*. The vehicle body 10 is supported by the front wheel unit 1 and the driving wheel unit 2. The engine (not illustrated in the drawings) is at a back portion of the vehicle body 10. The roll-over protection frame 12 stands behind the driver's seat 11. The lifting/lowering mechanism 13 is in the form of a lifting/lowering link mechanism. The mower unit 3 is disposed in a space under the vehicle body 10 and between the front wheel unit 1 and the driving wheel unit 2. The mower unit 3 is suspended from the vehicle body 10 in such a manner as to be capable of being lifted and lowered by means of the lifting/lowering mechanism 13.

Figure 2:
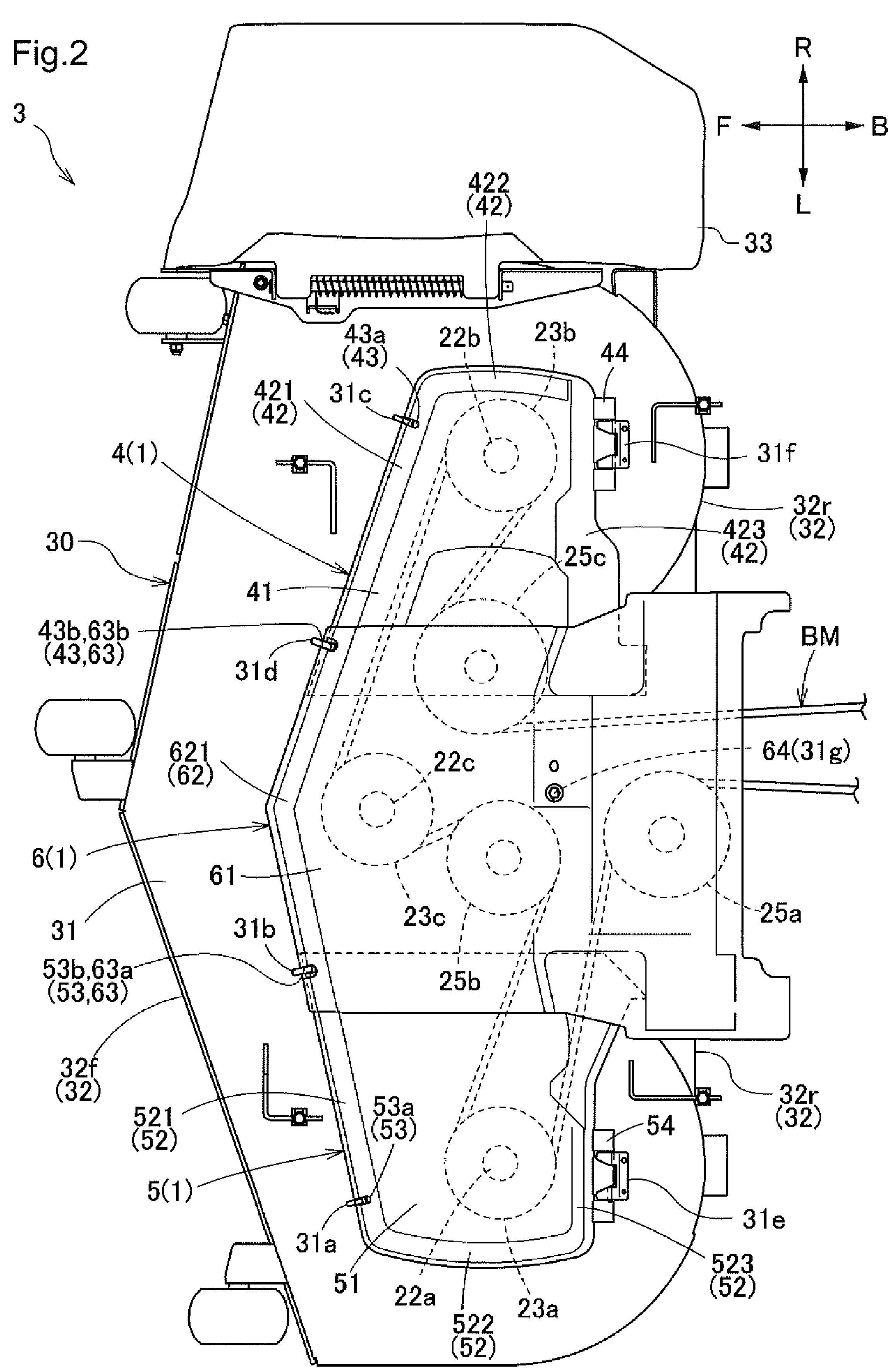
FIG. 2 is a view of a mower unit in its entirety.
Figure 3:
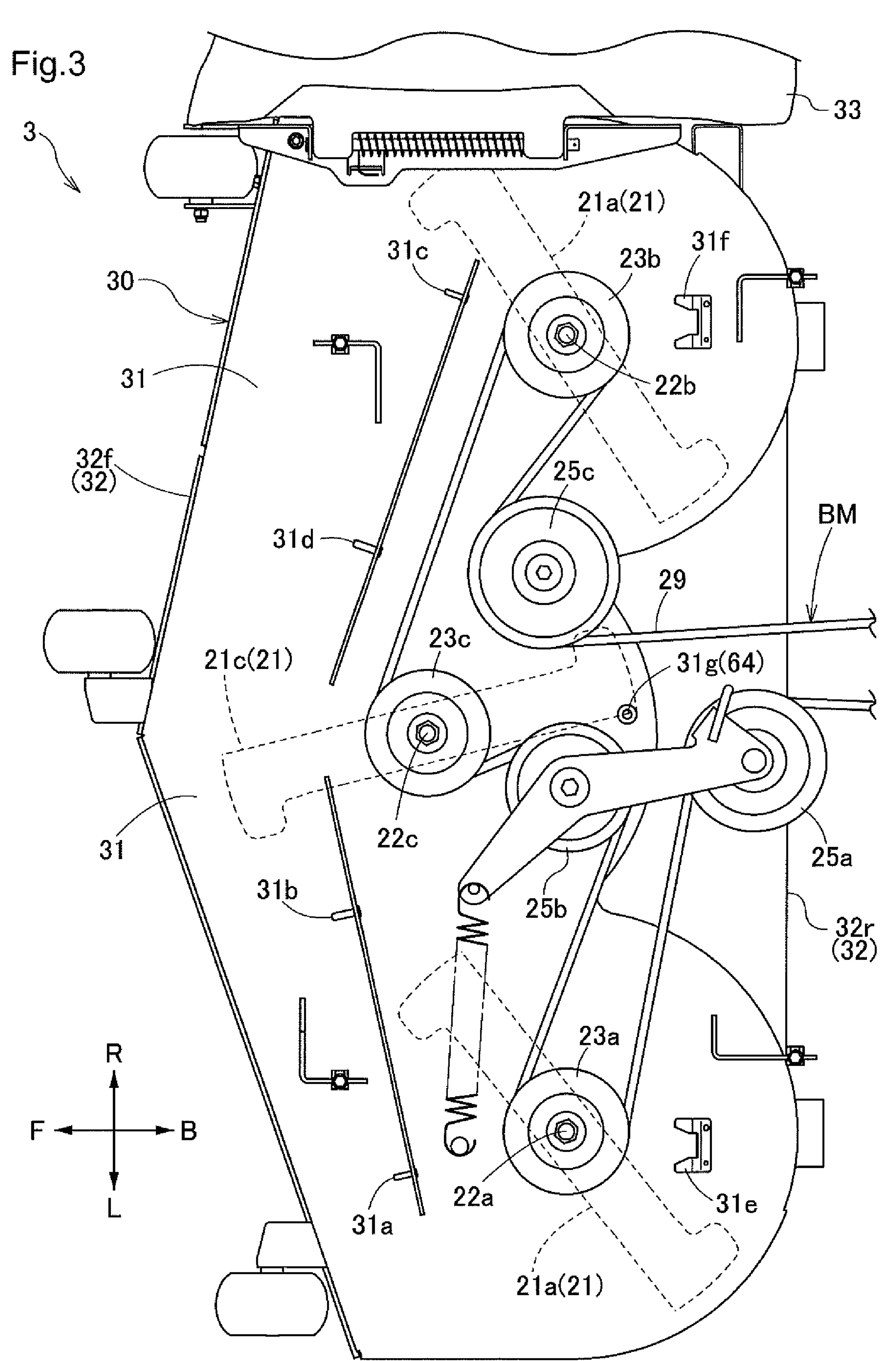
FIG. 3 is a view of a mower unit in its entirety with a cover unit removed.

The mower unit 3 as the present embodiment is, as illustrated in FIGS. 2 and 3, a three-blade mower unit of a side discharge type. The mower unit 3 includes a mower deck 30 including a top plate 31 and a side wall 32 extending downward from the periphery of the top plate 31. The top plate 31 and the side wall 32 define a closed space for cutting grass. The side wall 32 includes (i) a front side wall portion 32*f* extending downward from the front edge of the top plate 31 and (ii) a rear side wall portion 32*r* extending downward from the back edge of the top plate 31. The side wall 32 has in a right end region a cutout serving as a mown grass discharge port provided with a discharge port cover 33. The rear side wall portion 32*r* has (i) a left end region that is, in a plan view, curved in an arc along the area of rotation of the left blade 21*a* and (ii) a right end region that is, in a plan view, curved in an arc along the area of rotation of the right blade 21*b*. The rear side wall portion 32*r* has a central portion forward of the left and right end regions.

The mower unit 3 includes blade units attached to the top plate 31. The mower unit 3 as the present embodiment includes a left blade unit 20*a*, a right blade unit 20*b*, and a central blade unit 20*c*. The left blade unit 20*a* and the right blade unit 20*b* are on an identical transverse line of the mower deck 30, whereas the central blade unit 20*c* is offset forward of the left blade unit 20*a* and the right blade unit 20*b*.

Each blade unit includes a single horizontally rotatable blade 21. Specifically, the left blade unit 20*a* includes a left blade 21*a* inside the mower deck 30 and a left blade shaft 22*a* through the top plate 31. The left blade shaft 22*a* includes a lower portion to which the left blade 21*a* is attached and an upper portion which protrudes upward from the top plate 31. The right blade unit 20*b* includes a right blade 21*b* and a right blade shaft 22*b* configured similarly. The central blade unit 20*c* includes a central blade 21*c* and a central blade shaft 22*c* also configured similarly.

The mower unit 3 includes on the top plate 31 of the mower deck 30 a belt power transmission mechanism BM configured to transmit motive power from the engine to the left blade unit 20*a*, the right blade unit 20*b*, and the central blade unit 20*c*.

The belt power transmission mechanism BM includes a left input pulley 23*a* (which is an example of the "rotor") provided for an upper portion of the left blade shaft 22*a*, a right input pulley 23*b* (which is an example of the "rotor") provided for an upper portion of the right blade shaft 22*b*, and a central input pulley 23*c* (which is an example of the "rotor") provided for an upper portion of the central blade shaft 22*c*. The belt power transmission mechanism BM includes a power transmission belt 29 wound around an output pulley 42*a* on an output shaft 42 of the mower body, the left input pulley 23*a*, the right input pulley 23*b*, and the central input pulley 23*c*. The belt power transmission mechanism BM further includes a plurality of auxiliary pulleys around which the power transmission belt 29 is wound. The auxiliary pulleys for the present embodiment are a tension pulley 25*a* and idler pulleys 25*b* and 25*c*. The description below refers to these pulleys as a pulley group as well.

As illustrated in FIG. 2, the mower unit 3 includes a cover unit 1 provided for the top plate 31 and covering the pulleys on the top plate 31. The cover unit 1 for the present embodiment includes a left cover 5 (which is an example of the "at least one second cover"), a right cover 4 (which is an example of the "at least one second cover"), and an intermediate cover 6 (which is an example of the "first cover"). The left cover 5 includes an upper surface portion 51 and a side surface portion 52 extending downward from the edge of the upper surface portion 51. The side surface portion 52 includes a front section 521, a left section 522, and a back section 523. The left cover 5 is thus open on the right side. The right cover 4 includes an upper surface portion 41 and a side surface portion 42 extending downward from the edge of the upper surface portion 41. The side surface portion 42 includes a front section 421, a right section 422, and a back section 423. The right cover 4 is thus open on the left side. The intermediate cover 6 includes an upper surface portion 61 and a side surface portion 62 extending downward from the edge of the upper surface portion 61. The side surface portion 62 includes a front section 621. The intermediate cover 6 is thus open on the left, right, and back sides. The power transmission belt 29 extends backward from a back portion of the intermediate cover 6, and is wound around the output pulley 42 on the output shaft 100 of the mower body.

Figure 4:
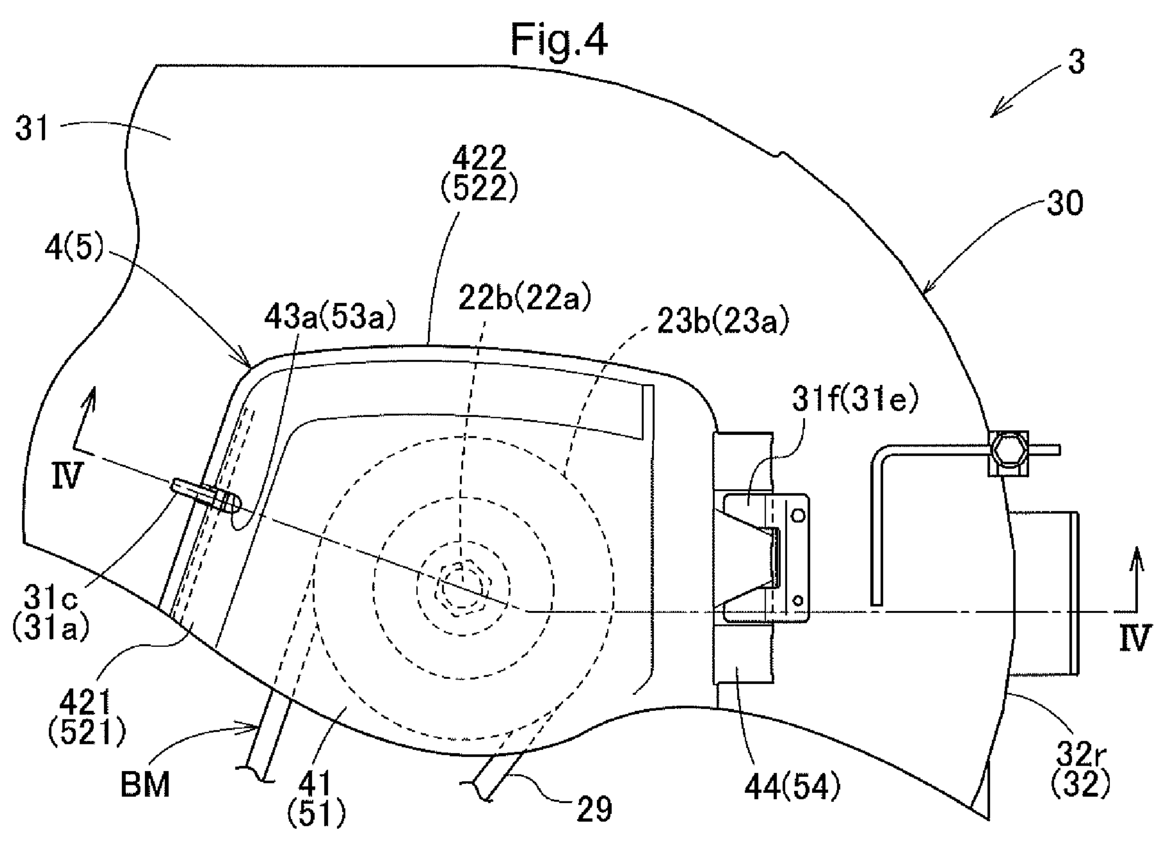
FIG. 4 is a detailed view of main parts of a mower unit.
Figure 5:
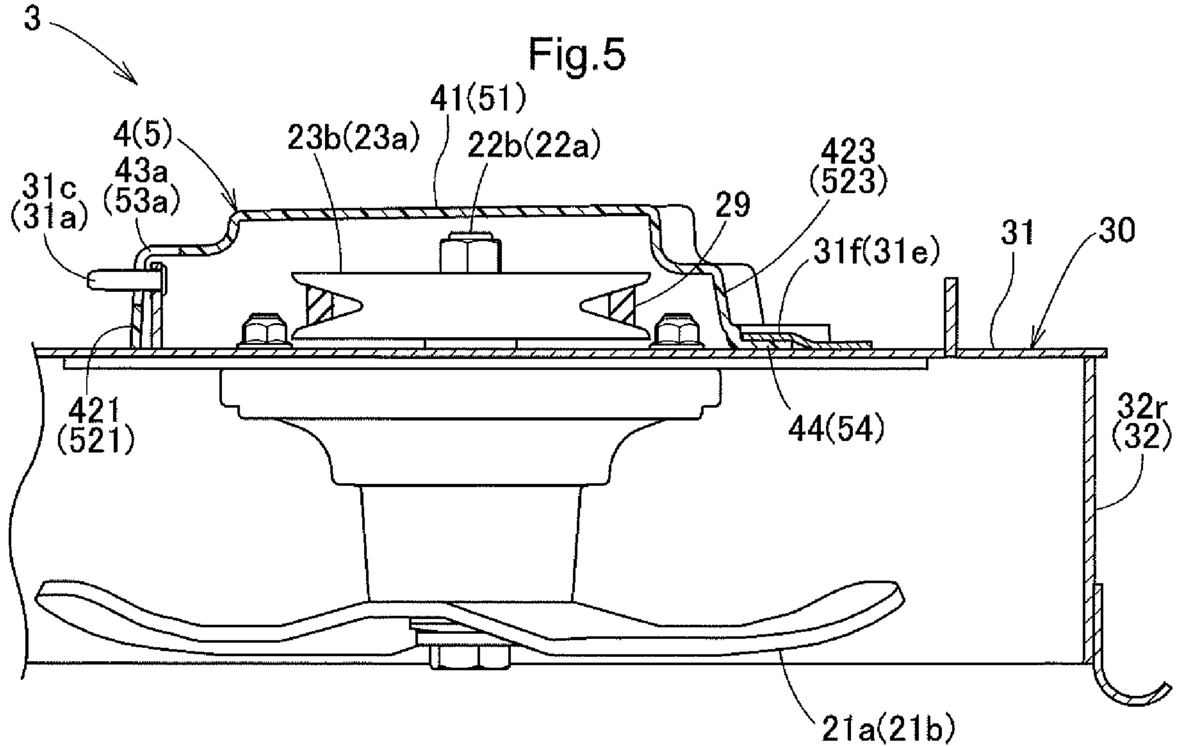
FIG. 5 is a cross-sectional view taken along line IV-IV.

As illustrated in FIGS. 1, 4, and 5, the left cover 5 has elongate holes 53 (which is an example of the "tool-free mounting portion") at a front portion thereof. The elongate holes 53 extend from the upper surface portion 51 to the front section 521 of the side surface portion 52. The left cover 5 for the present embodiment includes two elongate holes 53, namely, an elongate hole 53*a* outward in the width direction of the mower body and an elongate hole 53*b* inward in the width direction of the mower body. The left cover 5 includes at a back portion thereof a tongue 54 (which is an example of the "tool-free mounting portion") extending backward from a lower end of the back section 523 of the side surface portion 52. The left cover 5 for the present embodiment includes a single tongue 54.

As illustrated in FIGS. 1, 4, and 5, the right cover 4 has elongate holes 43 (which is an example of the "tool-free mounting portion") at a front portion thereof. The elongate holes 43 extend from the upper surface portion 41 to the front section 421 of the side surface portion 42. The right cover 4 for the present embodiment includes two elongate holes 43, namely, an elongate hole 43*a* outward in the width direction of the mower body and an elongate hole 43*b* inward in the width direction of the mower body. The right cover 4 includes at a back portion thereof a tongue 44 (which is an example of the "tool-free mounting portion") extending backward from a lower end of the back section 423 of the side surface portion 42. The right cover 4 for the present embodiment includes a single tongue 44.

As described above, the left and right covers 5 and 4 each include only a tool-free mounting portion and not a tool-based mounting portion.

Figure 6:
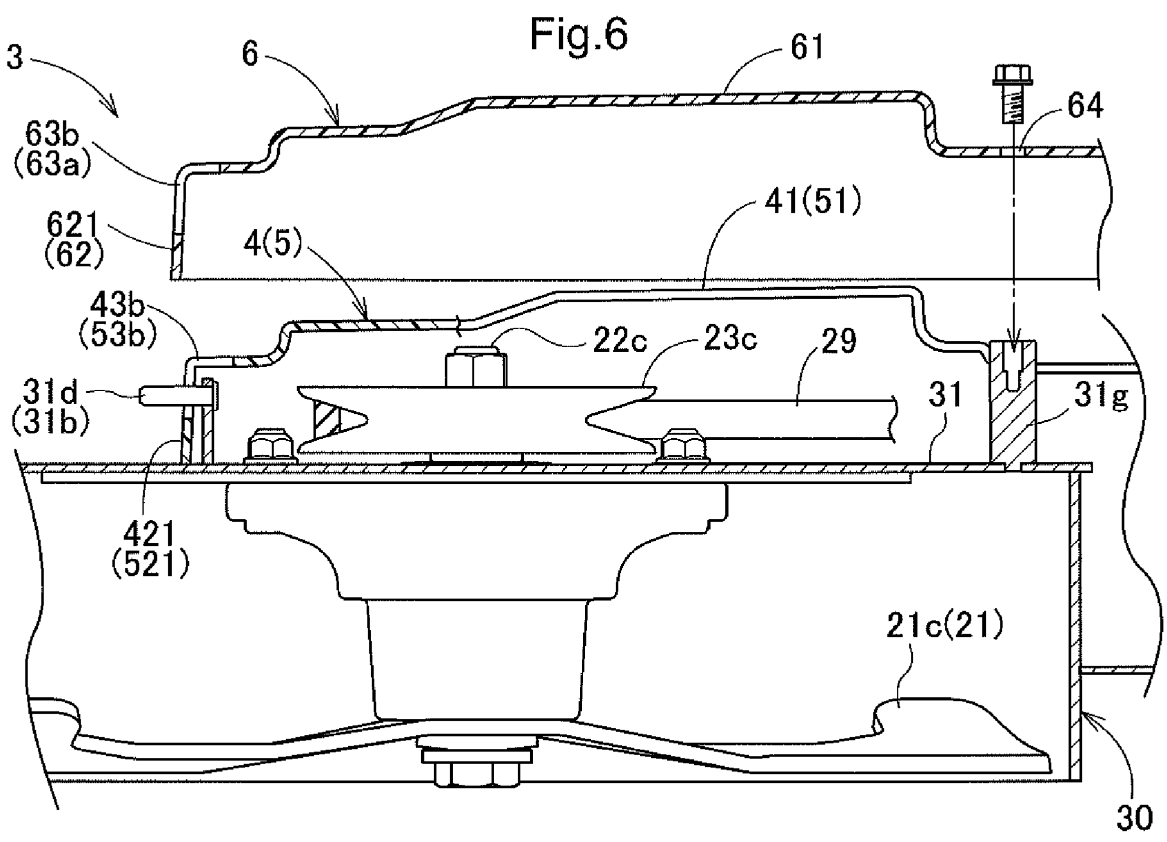
FIG. 6 is a cross-sectional view of main parts of a mower unit with an intermediate cover unmounted.
Figure 7:
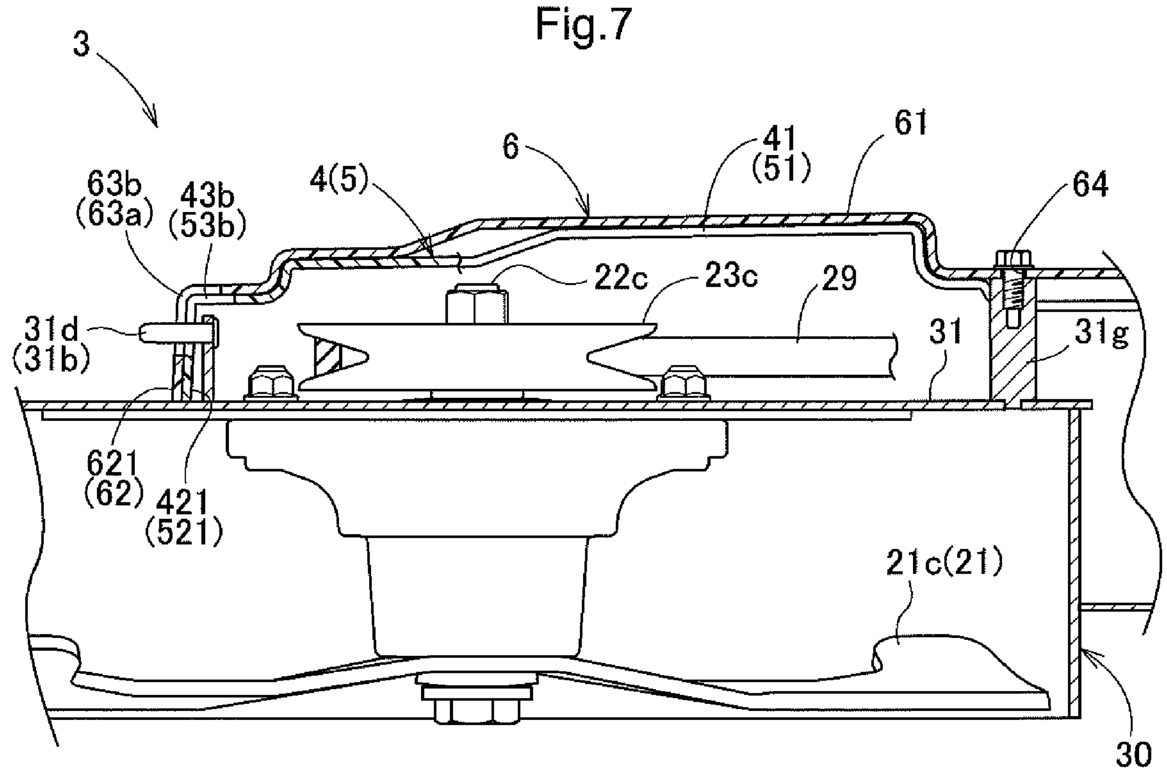
FIG. 7 is a cross-sectional view of main parts of a mower unit with an intermediate cover mounted.

As illustrated in FIGS. 1, 6, and 7, the intermediate cover 6 has elongate holes 63 (which is an example of the "tool-free mounting portion") at a front portion thereof. The elongate holes 63 extend from the upper surface portion 61 to the front section 621 of the side surface portion 62. The intermediate cover 6 for the present embodiment includes two elongate holes 63, namely, an elongate hole 63*a* leftward in the width direction of the mower body and an elongate hole 63*b* rightward in the width direction of the mower body. The upper surface portion 61 of the intermediate cover 6 has a bolt insertion hole 64 (which is an example of the "tool-based mounting portion") in the vicinity of the center in the width direction of the upper surface portion 61. The upper surface portion 61 for the present embodiment has a single bolt insertion hole 64. As mentioned above, the intermediate cover 6 includes both a tool-based mounting portion and a tool-free mounting portion.

As illustrated in FIGS. 2 and 3, the mower unit 3 includes studs (which is an example of the "tool-free mounting mechanism") provided for the top plate 31 and forward of the pulley group. The mower unit 3 as the present embodiment includes four studs 31*a*, 31*b*, 31*c*, and 31*d*. The top plate 31 is provided with a pair of left and right band plates. The studs 31*a*, 31*b*, 31*c*, and 31*d* are disposed on the band plates and protrude forward from the band plates. The present embodiment is configured such that two studs are disposed on each band plate; specifically, the studs 31*a* and 31*b* are disposed on the left band plate and outward and inward, respectively, in the width direction of the mower body, whereas the studs 31*c* and 31*d* are disposed on the right band plate and outward and inward, respectively, in the width direction of the mower body.

As illustrated in FIGS. 2 and 3, the top plate 31 is provided with a hook 31*e* backward of the left input pulley 23*a*, a hook 31*f* backward of the right input pulley 23*b*, and a boss 31*g* corresponding in position to the bolt insertion hole 64. The boss 31*g* has a screw hole into which a bolt is screwed. The bolt and the boss 31*g* are an example of the "tool-based mounting mechanism".

The cover unit 1 is mountable onto the mower deck 30, for instance, through a procedure of, as illustrated in FIGS. 4 and 5, first fitting the stud 31*a* into the elongate hole 53*a* in the left cover 5, fitting the stud 31*b* into the elongate hole 53*b*, and hooking the tongue 54 on the hook 31*e* to mount the left cover 5 onto the mower deck 30. This is followed by, as illustrated in FIGS. 4 and 5, fitting the stud 31*c* into the elongate hole 43*a* in the right cover 4, fitting the stud 31*d* into the elongate hole 43*b*, and hooking the tongue 54 on the hook 31*f* to mount the right cover 4 onto the mower deck 30.

The above operation is followed by, as illustrated in FIGS. 6 and 7, fitting the stud 31*b* into the elongate hole 63*a* in the intermediate cover 6 and fitting the stud 31*d* into the elongate hole 63*b* to place a left end portion of the intermediate cover 6 over a right end portion of the left cover 5 and a right end portion of the intermediate cover 6 over the left end portion of the right cover 4. The stud 31*b* serves for the left and intermediate covers 5 and 6, whereas the stud 31*d* serves for the right and intermediate covers 4 and 6.

The above operation is followed by, as illustrated in FIGS. 6 and 7, inserting a bolt through the bolt insertion hole 64 and screwing the bolt into the screw hole in the boss 31*g*. These operations allow the left, right, and intermediate covers 5, 4, and 6 to be mounted onto the mower deck 30. The present embodiment thus involves a single bolt and nut as a tool-based mounting mechanism.

The cover unit 1 is removable from the mower deck 30, for instance, through a procedure of removing the bolt to allow the intermediate cover 6 to be moved forward, moving the intermediate cover 6 forward to allow the intermediate cover 6 to be removed from the mower deck 30, removing the intermediate cover 6 from the mower deck 30 to allow the left and right covers 5 and 4 to be moved forward, moving the left and right covers 5 and 4 forward to allow the left and right covers 5 and 4 to be removed from the mower deck 30, and removing the left and right covers 5 and 4 from the mower deck 30.

Alternative Embodiments (1) The embodiment described above is a mid-mount, riding-type mower as an example mower including a mower unit as an embodiment of the present invention. The present invention is, however, not limited to such an embodiment, and may be, for example, another riding-type mower such as a front-mount, riding-type electric mower or a walk-behind mower. The mower unit as an embodiment of the present invention is not necessarily included in a dedicated mower, and may be included in a work machine other than a dedicated mower such as a tractor.

(2) The embodiment described above is an example mower unit drivable on a driving force from an engine. The present invention is, however, not limited to such an embodiment, and may be, for example, a mower unit drivable by something other than an engine such as an electric motor.

(3) The embodiment described above is an example mower unit of a side discharge type. The present invention is, however, not limited to such an embodiment, and may be, for example, a mower unit of another type such as a mulching mower unit. Further, the number of blades is not necessarily three, and may alternatively be one, two, or four or more.

(4) The embodiment described above includes a pulley as an example rotor. The rotor is, however, not necessarily a pulley, and may be, for example, something configured to rotate for motive power transmission such as a gear or a rotary shaft, or a combination of a pulley and a rotor other than a pulley.

(5) The embodiment described above includes an example cover unit including a left cover, a right cover, and an intermediate cover. The present invention is, however, not limited to such an embodiment. The cover unit may alternatively be made up of one, two, or four or more members.

(6) The embodiment described above is an example including a bolt and nut as a tool-based mounting mechanism. The tool-based mounting mechanism is, however, not necessarily a bolt and nut, and may be any mounting mechanism that requires a tool for removal of a cover. The tool-based mounting mechanism does not necessarily require a common tool such as a wrench or a screwdriver for removal of a cover, and may alternatively require a dedicated tool such as a key.

(7) The embodiment described above is an example including a stud and hook as a tool-free mounting mechanism. The tool-free mounting mechanism is, however, not necessarily a stud and hook, and may be any mounting mechanism that requires no tool for removal of a cover.

Figure 8:
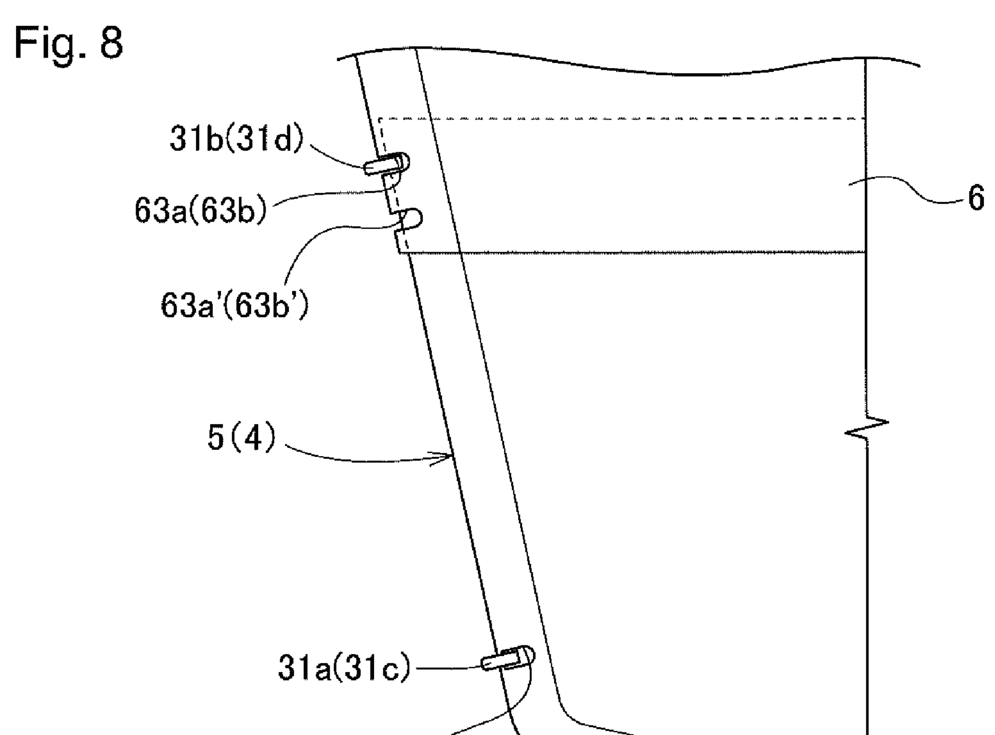
FIG. 8 is a view of an intermediate cover for an alternative embodiment.
Figure 9:
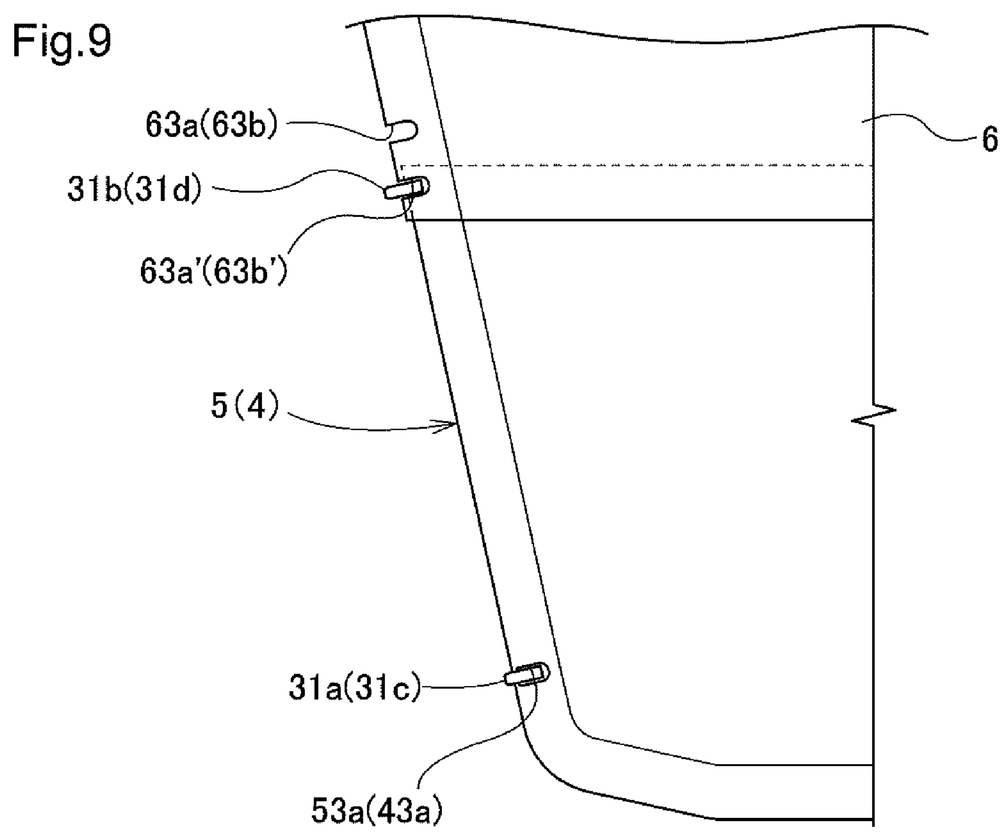
FIG. 9 is a view of an intermediate cover for an alternative embodiment.

(8) The mower deck 30 may have any of different sizes. In view of that, the cover unit 1 may be configured as below, for instance, to be compatible with a mower deck 30 of any of different sizes. This alternative embodiment is configured, as illustrated in FIGS. 8 and 9, such that the intermediate cover 6 has two elongate holes 63_a_' and 63_b_' in addition to the elongate holes 63_a_ and 63_b_. The elongate holes 63_a_' and 63_b_' are outward of the elongate holes 63_a_ and 63_b_, respectively, in the width direction of the mower body.

As illustrated in FIG. 8, the intermediate cover 6 is mounted onto a small-sized mower deck 30 through a procedure that includes fitting the studs 31_b_ and 31_d_ into the elongate holes 63_a_ and 63_b_, respectively. As illustrated in FIG. 9, the intermediate cover 6 is mounted onto a large-sized mower deck 3 through a procedure that includes fitting the studs 31_b_ and 31_d_ into the elongate holes 63_a_' and 63_b_', respectively.

The intermediate cover 6 may have only either of the elongate holes 63_a_' and 63_b_' in addition to the elongate holes 63_a_ and 63_b_. These configurations allow the cover unit 1 to be compatible with differently sized mower decks 30, thereby eliminating the need to prepare differently sized cover units and allowing use of common parts.

Figure 10:
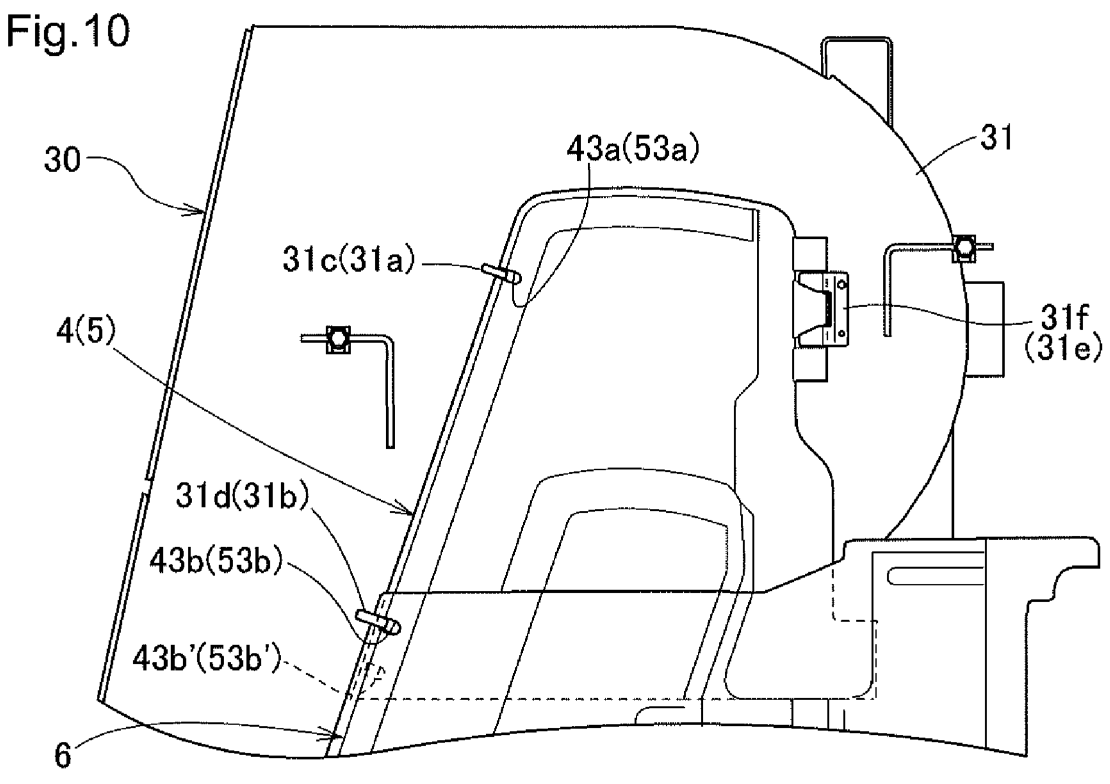
FIG. 10 is a view of a right cover for an alternative embodiment.
Figure 11:
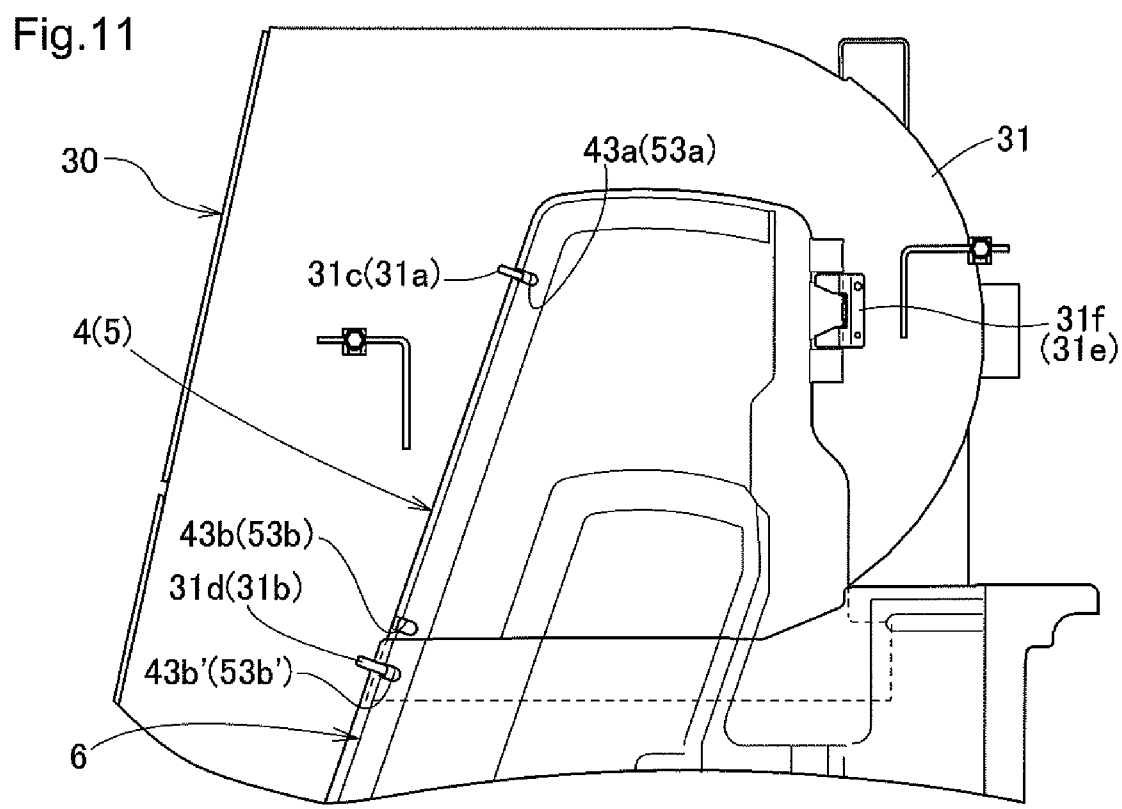
FIG. 11 is a view of a right cover for an alternative embodiment.

(9) The cover unit 1 may alternatively be configured as below to be compatible with a mower deck 30 of any of different sizes. This alternative embodiment is configured, as illustrated in FIGS. 10 and 11, such that the right cover 4 has an elongate hole 43_b_' in addition to the elongate hole 43_b_ and that the left cover 5 has an elongate hole 53_b_' in addition to the elongate hole 53_b_. The elongate hole 43_b_' is inward of the elongate hole 43_b_ in the width direction of the mower body (that is, leftward of the elongate hole 43_b_ in the width direction of the right cover 4). The elongate hole 53_b_' is inward of the elongate hole 53_b_ in the width direction of the mower body (that is, rightward of the elongate hole 53_a_ in the width direction of the left cover 5).

As illustrated in FIG. 10, the right and left covers 4 and 5 are mounted onto a small-sized mower deck through a procedure that includes fitting the studs 31_d_ and 31_b_ into the elongate holes 43_b_ and 53_b_, respectively. As illustrated in FIG. 11, the right and left covers 4 and 5 are mounted onto a large-sized mower deck through a procedure that includes fitting the studs 31_d_ and 31_b_ into the elongate holes 43_b_' and 53_b_', respectively. Alternatively, only either of the right and left covers 4 and 5 may be configured as above. These configurations allow the cover unit 1 to be compatible with differently sized mower decks 30, thereby eliminating the need to prepare differently sized cover units and allowing use of common parts.

The invention claimed is:

1. A mower unit mountable on a travel body, the mower unit comprising:

a mower deck open downward;

a rotary blade disposed inside the mower deck and rotatable about a vertical axis;

a rotor disposed outside the mower deck and configured to transmit a rotation motive power to the rotary blade;

a cover unit covering the rotor; and mounting mechanisms detachably mounting the cover unit on the mower deck, the mounting mechanisms including:

a tool-based mounting mechanism involving a tool to detach the cover unit; and a tool-free mounting mechanism involving no tool to detach the cover unit, wherein the cover unit includes:

a first cover including a tool-based mounting portion as a mounting portion for the tool-based mounting mechanism; and at least one second cover including a tool-free mounting portion as a mounting portion for the tool-free mounting mechanism and including no tool-based mounting portion, and wherein with the at least one second cover mounted on the mower deck with use of the tool-free mounting mechanism, mounting the first cover onto the mower deck with use of the tool-based mounting mechanism prevents the at least one second cover from being removed from the mower deck, and removing the first cover from the mower deck allows the at least one second cover to be removed from the mower deck.

2. The mower unit according to claim 1, wherein the first cover covers a portion of the at least one second cover when mounted on the mower deck.

3. The mower unit according to claim 1, wherein the at least one second cover includes:

a left cover leftward of the first cover; and a right cover rightward of the first cover, and the first cover has (i) a left end portion overlapping a right end portion of the left cover and (ii) a right end portion overlapping a left end portion of the right cover.

4. The mower unit according to claim 1, wherein the first cover further includes a tool-free mounting portion.

5. The mower unit according to claim 4, wherein the first cover and the at least one second cover share at least a portion of the tool-free mounting mechanism.

6. The mower unit according to claim 5, wherein the first cover and the at least one second cover share a portion of the tool-free mounting mechanism which portion is disposed in an area in which the first cover and the at least one second cover overlap each other.

7. The mower unit according to claim 1, wherein the tool-based mounting mechanism includes a bolt for fixing the cover unit to the mower deck.

8. The mower unit according to claim 1, wherein the tool-free mounting mechanism is configured such that moving the cover unit from a first side in a front-back direction toward a second side in the front-back direction mounts the cover unit onto the mower deck.

9. The mower unit according to claim 1, wherein the tool-free mounting mechanism includes:

at least one stud disposed on the mower deck and insertable through a hole in the cover unit; and a hook disposed on the mower deck configured to receive a tongue on the cover unit.

10. The mower unit according to claim 9, wherein the at least one stud is forward in a front-back direction of the travel body, and the hook is backward in the front-back direction of the travel body.

11. The mower unit according to claim 1, wherein the at least one stud includes a plurality of studs at least one of which the first cover and the at least one second cover share.

12. A work machine, comprising:

a travel body; and a mower unit according to claim 1.

* * * * *